United States Patent
Chen et al.

(10) Patent No.: US 8,463,055 B2
(45) Date of Patent: Jun. 11, 2013

(54) METHOD FOR PROGRESSIVE JPEG IMAGE DECODING AND METHOD FOR CONTROLLING DECODER

(75) Inventors: Yu-Chi Chen, Hsinchu (TW); Chi-Wen Huang, Taichung County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1410 days.

(21) Appl. No.: 11/937,512

(22) Filed: Nov. 9, 2007

(65) Prior Publication Data

US 2008/0112629 A1 May 15, 2008

(30) Foreign Application Priority Data

Nov. 10, 2006 (TW) .............................. 95141632 A

(51) Int. Cl.
*G06K 9/36* (2006.01)
*G06K 9/46* (2006.01)

(52) U.S. Cl.
USPC ........................................................ 382/232

(58) Field of Classification Search
None
See application file for complete search history.

(56) References Cited

U.S. PATENT DOCUMENTS

| 7,187,802 | B2* | 3/2007 | Ju | 382/233 |
| 7,245,396 | B2* | 7/2007 | Sakamoto | 358/1.9 |
| 7,313,281 | B2* | 12/2007 | Ju | 382/233 |
| 7,352,904 | B2* | 4/2008 | Keng et al. | 382/233 |
| 7,742,199 | B2* | 6/2010 | Kanno | 358/474 |
| 2003/0091240 | A1 | 5/2003 | Ju | |
| 2005/0047667 | A1* | 3/2005 | Ju | 382/233 |

OTHER PUBLICATIONS

CCITT, T.81, Sep. 1992.*

* cited by examiner

*Primary Examiner* — Samir Ahmed
(74) *Attorney, Agent, or Firm* — Jianq Chyun IP Office

(57) ABSTRACT

A method for progressive JPEG image decoding and a method for controlling a decoder are disclosed. In the image decoding method, an amount of macroblocks that can be stored during the process of decoding is determined according to the size of the memory, and then, according to the amount of macroblocks, a scan layer is divided into a plurality of decoding areas. In each turn of decoding, data of the same decoding area in all the scan layers are decoded. In the next turn, a decoding area next to the previous one is selected for decoding. Therefore, the present invention can decode the image correctly with a limited memory resource, without affecting the display quality of the image. The image decoding method also can be applied to the control of a decoder, so as to reduce the occupied memory capacity.

9 Claims, 6 Drawing Sheets

METHOD FOR PROGRESSIVE JPEG IMAGE DECODING AND METHOD FOR CONTROLLING DECODER

CROSS-REFERENCE TO RELATED APPLICATION

This application claims the priority benefit of Taiwan application serial no. 95141632, filed on Nov. 10, 2006. All disclosure of the Taiwan application is incorporated herein by reference. The entity of the above-mentioned patent application is hereby incorporated by reference herein and made a part of specification.

BACKGROUND OF THE INVENTION

1. Field of the Invention

The present invention relates to an image decoding method, and more particularly to a method for progressive JPEG image decoding.

2. Description of Related Art

Joint Photographic Experts Group (JPEG) compression technology on the basis of progressive discrete cosine transformation (DCT) encodes the whole image by scanning for a plurality of times such that the encoded JPEG data stream includes data of a plurality of scan layers. Therefore, during the process of decoding, the data of the plurality of scan layers must be decoded to re-establish the original image, and since one part of the characteristics of the original image is recorded in each scan layer, the image decoded from each scan layer roughly presents the original image, and the image definition will be enhanced as the number of the decoded scan layers increases.

FIG. 1 shows a conventional progressive JPEG decoding device. Referring to FIG. 1, the decoding device 100 includes a variable length decoding (VLD) device 110, a memory device 120, an inverse quantizer 130 and an inverse DCT device 140. The decoding process on the basis of progressive DCT needs to be processed through the above devices, and the flow is described as follows.

First, the encoded JPEG data is processed by the VLD device 110. When each scan layer is processed by the VLD device 110, the information of the previous scan layer is required as a reference, thus, the processing result must be stored in the memory device 120 having the same size with the image, which is used as a reference for processing the next scan layer by the VLD device 110. When the memory device 120 has collected all coefficients of a scan layer, the coefficients are sequentially sent to the inverse quantizer 130 and the inverse DCT device 140 to perform inverse quantizing process and inverse DCT process, so as to obtain decoded pixels and re-establish a progressive image.

If the above progressive JPEG image decoding device and the operating method thereof are applied to control a decoder, that is, controlling a decoding unit with a control system and decoding bitstream data into image data, a memory having the same size with the picture to be decoded is required to achieve the image decoding effect. FIG. 2 is a block diagram of a control system of a conventional decoder, and FIG. 3 is a flow chart of a conventional method for controlling a decoder. Referring to FIG. 2 first, a control system 200 includes a control unit 210, a data unit 220, a decoding unit 230, and a memory 240, wherein the control unit 210 is individually connected to the data unit 220 and the decoding unit 230, and the decoding unit 230 is further connected to the memory 240. The size of the memory 240 must be the same as that of the picture to be decoded, such that the memory 240 can be used to store the decoding result as the reference information during the decoding process.

Referring to both FIG. 2 and FIG. 3, the state of the control unit 210 at the very beginning is set to be an Initial state, and in Step S301, the control unit 210 sends a reset instruction to the decoding unit 230, and the decoding unit 230 resets its internal state and empties the memory 240.

In Step S302, the control unit 210 sends a data require instruction to the data unit 220, and then, the data unit 220 transmits the bitstream data to the decoding unit 230. At the same time, the control unit 210 further sends a decode instruction to the decoding unit 230 that sequentially receives the bitstream data from the data unit 220 to perform decoding, and the decoding coefficients generated during the decoding are stored in the memory 240, and at this time, the control unit 210 is at a Decode state.

In Step S303, when the decoding unit 230 has decoded all the bitstream data, the decoding unit 230 is switched to a Finish state. At this time, the control unit 210 knows that all the decoding flows have been completed. If there is no data in the data unit 220, the decoding unit is switched to a Data_empty state, and at this time, the control unit 210 sends a new data require instruction to the data unit 220. When the data transmission of the data unit 220 is resumed, the decoding unit 230 is switched to the Decode state to continue decoding. Moreover, if a decoding error occurs when decoding by the decoding unit 230, the decoding unit 230 is switched to an Error state, and then, the control unit 210 determines the method for processing the error. The above method for progressive JPEG decoding and the method for controlling the decoder may possess the feature of progressive image displaying, but the size of the decodable image is limited by the memory space.

US Patent No. 2003/0091240 has disclosed a progressive JPEG decoding method, which includes the following steps: receiving data of a scan layer of a JPEG image data, and dividing the scan layer into a plurality of areas; selecting one of the areas as a local decoding area; decoding the scan layer, wherein a plurality of decoding coefficients is generated according to the data of the local decoding area, and non-zero historic records of the other areas directing to the decoding coefficients are generated according to the data of the other areas except the local decoding area, and the initial addresses in the JPEG bitstream are also generated; and storing the generated results in the memory as the reference data for the subsequent decoding of other areas. The important feature of this method lies in dividing the progressive JPEG image into different areas, decoding one area each time; and decoding another area after the decoding of the previous one is completed, wherein the size of the decoding area may be adjusted according to the size of the memory, and the decoding process can be performed without disposing a memory having the same size as that of the image. However, a large amount of non-zero historic records and the initial addresses of each area must be recorded, which still occupies a large memory space.

SUMMARY OF THE INVENTION

Accordingly, the present invention is directed to a method for progressive JPEG image decoding, wherein a scan layer is divided into a plurality of decoding areas for being decoded respectively, so as to avoid the size of the decodable image from being limited by the memory space.

The present invention is also directed to a method for controlling a decoder, wherein through dividing a scan layer into a plurality of decoding areas for being decoded respectively, the decoder is controlled to decode the decoding areas respectively, so as to greatly reduce the memory usage.

As embodied and broadly described herein, the present invention provides a method for progressive JPEG image decoding, which is suitable for decoding a batch of bitstream data into an image data, wherein the bitstream data comprises data of a plurality of scan layers, and the method comprises the following steps. First, a scan layer is divided into a plurality of decoding areas. Next, the decoding areas are sequentially selected as a local decoding area. Next, the data of a first scan layer in the bitstream data is sequentially received, the data in the local decoding area of the first scan layer is decoded, and a plurality of local decoding coefficients to be stored in a memory is generated. Next, the data of a next scan layer is sequentially received in the bitstream data, the data in the local decoding area of the next scan layer is continuously decoded and the obtained local decoding coefficients is accumulated to the local decoding coefficients stored in the memory. Next, the accumulated local decoding coefficients are processed with inverse quantizing and inverse DCT processes and output as a part of the image data.

According to an embodiment of the present invention, before receiving the data of the next scan layer, when decoding the data of a next decoding area of the next scan layer, first the last decoding address of the previous decoding of the next scan layer is loaded, then the data of the next local decoding area from the last decoding address is decoded, the foregoing steps are repeated for decoding the data in the local decoding areas of all the scan layers, and finally the decoded data are output as a part of the image data.

According to an embodiment of the present invention, the size of the divided decoding area is determined by the size of the memory.

According, to an embodiment of the present invention, when the data of decoding areas of all the scan layers in the bitstream data are all decoded, a complete image data is formed.

According to an embodiment of the present invention, the local decoding coefficients are processed through inverse quantizing and inverse DCT, and a part of the image data is output after being scaled by a scaler.

The present invention provides a method for controlling a decoder, which is suitable for using a control system to control a decoding unit to decode a batch of bitstream data into an image data, wherein the control system comprises a control unit, a data unit, a first memory and a second memory; and the bitstream data comprises data of a plurality of scan layers. The method comprises the following steps. At step (a) the control unit sends a reset instruction to the decoding unit, and the decoding unit resets its internal state and empties the first memory. At step (b), the control unit determines a macroblock number (MBN) according to the size of the first memory, and sends an MBN instruction to the decoding unit. At step (c), the control unit sends a data require instruction to the data unit, the data unit transmits the bitstream data to the decoding unit, and meanwhile, the control unit sends a decode instruction to the decoding unit, and the decoding unit sequentially receives the data of a first scan layer in the bitstream data from the data unit, decodes the data of an MBN, generates a plurality of local decoding coefficients and stores them in the first memory. At step (d), the control unit records the last decoding address of the first scan layer in the second memory as an initial position for the next decoding of the first scan layer. At step (e), the control unit sends a scan layer-start-find instruction to the decoding unit, and the decoding unit looks for the initial address of a scan layer next to the first scan layer, and sends a find-complete instruction back to the control unit. At step (f), the control unit sends a decode instruction to the decoding unit, and the decoding unit sequentially receives the data of the next scan layer in the bitstream data from the data unit, the data of an MBN of the next scan layer is decoded, and the obtained local decoding coefficients is accumulated to the local decoding coefficients stored in the first memory. At step (g), the control unit records the last decoding address of the next scan layer in the second memory as the initial position for the next decoding of the next scan layer. Next, the above steps (e)-(g) are repeated until the data of the MBN of all the scan layers are decoded.

According to an embodiment of the present invention, after Step h, the method further comprises following steps. At step (i), an MBN decode-complete instruction is sent back to the control unit using the decoding unit. At step (j), a scan layer-position-restore instruction is sent to the decoding unit using the control unit for setting the decoding unit back to the first scan layer accordingly, and meanwhile an MBN instruction is sent to the decoding unit. At step (k), the last decoding address of the previous decoding of the first scan layer from the second memory is read using the control unit and transmitted to the data unit, and the data of the first scan layer is transmitted to the decoding unit beginning from the last decoding address of the first scan layer using the data unit. At step (l), a decode instruction is sent to the decoding unit using the control unit, and the data of an MBN of the first scan layer is decoded using the decoding unit. At step (m), an MBN decode-complete instruction is sent to the control unit each time using the decoding unit when the decoding for the data of the MBN of the scan layer is completed, and the last decoding address of the decoding area in the second memory is recorded by the control unit. At step (n), the method is returned back to Step (k) to continue decoding the data of an MBN of a scan layer next to the first scan layer until the data of the MBN of all the scan layers are decoded. At step (o), the method is returned back to Step (j) to continue decoding the data of a next MBN of the scan layers until the data of all decoding blocks in the scan layers are decoded.

Thus, by dividing the scan layer into a plurality of decoding areas for being decoded respectively, the JPEG image can be correctly decoded and displayed under a limited memory source.

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

To make the content of the present invention be more comprehensible, embodiments are taken as examples for implementing the present invention accordingly.

First Embodiment

In a progressive decoding method, each time when decoding the data of a scan layer, the decoded image data must be stored in a memory, and a complete image data is output after the data of all the scan layers are decoded. Therefore, the size of a decodable pixel is limited by the memory capacity. In this embodiment, according to the memory capacity of the system, the scan layer is divided into a plurality of decoding areas for being decoded respectively, so as to resolve the above problem that the size of a decodable pixel is limited by the memory capacity.

Figure 1:
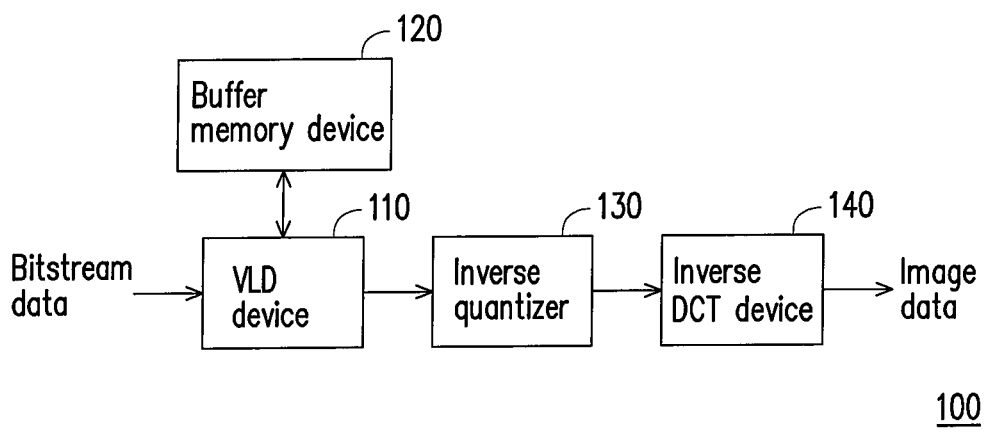
FIG. 1 is a conventional progressive JPEG decoding device.
Figure 2:
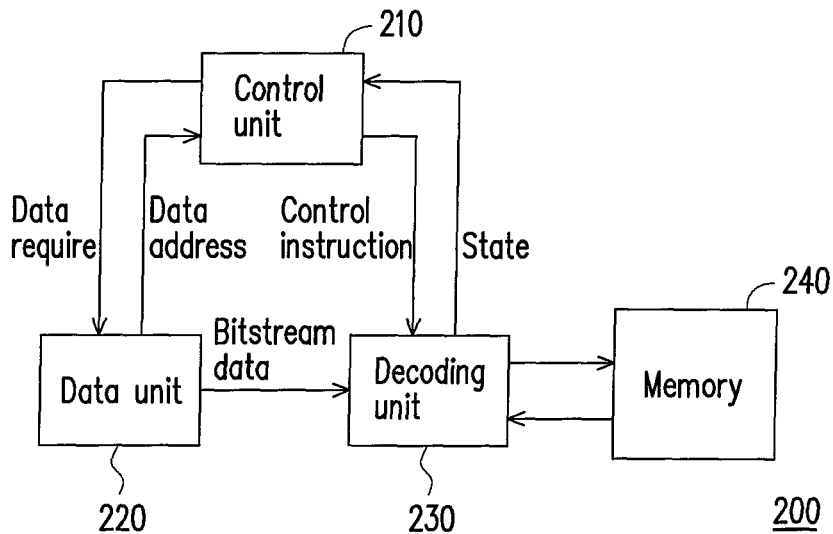
FIG. 2 is a block diagram of a control system of a conventional decoder.
Figure 3:
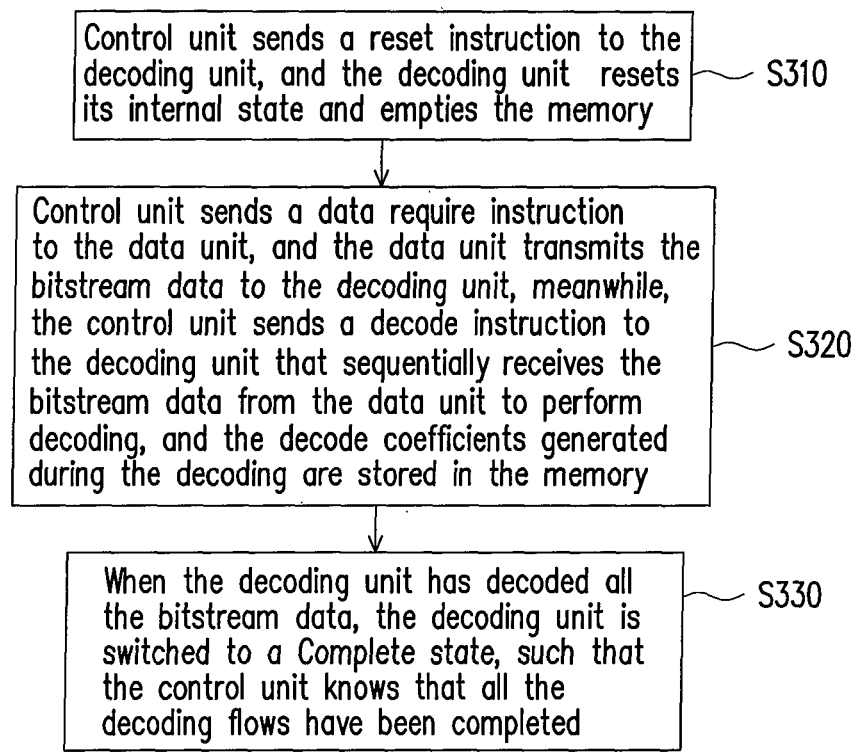
FIG. 3 is a flow chart of a conventional method for controlling a decoder.
Figure 4:
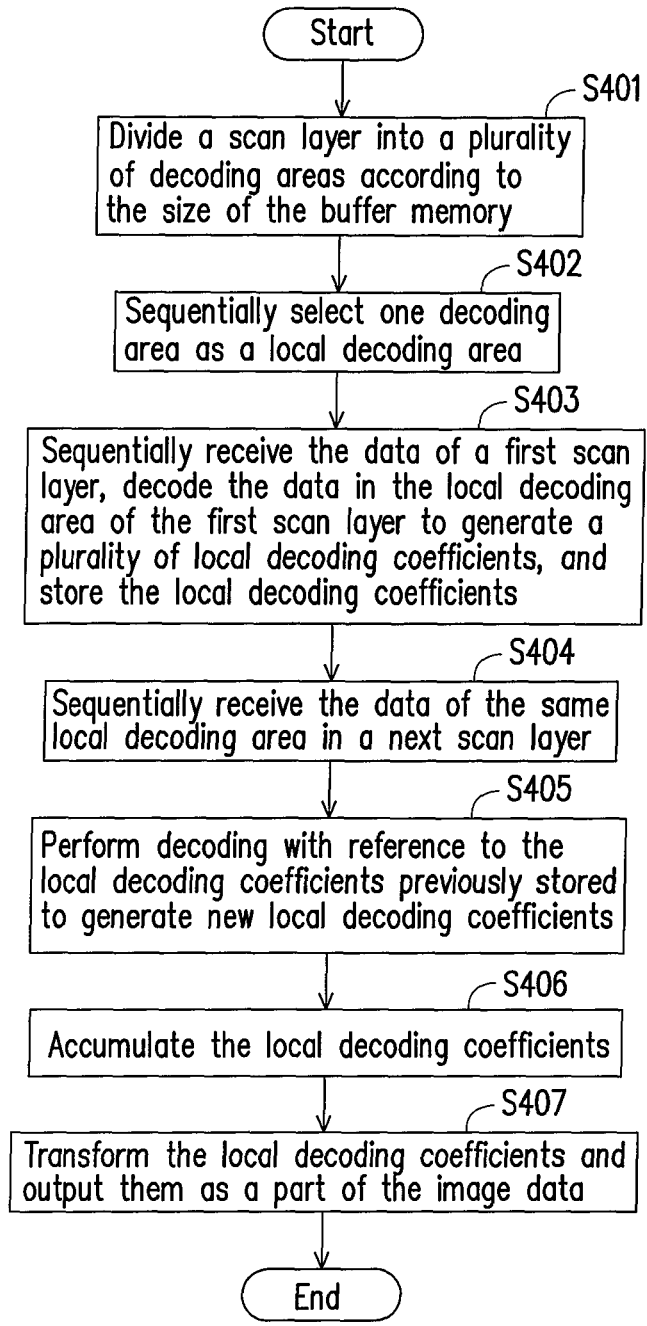
FIG. 4 is a flow chart of a method for progressive JPEG image decoding according to a first embodiment of the present invention.

FIG. 4 is a flow chart of a method for progressive JPEG image decoding according to a first embodiment of the present invention. Referring to FIG. 4, this embodiment is suitable for decoding a bitstream data containing data of a plurality of scan layers into an image data, and the detailed steps of the decoding method in this embodiment are described herein below.

First, a scan layer is divided into a plurality of decoding areas (Step S401). The size of the divided decoding areas is determined by the memory capacity, that is, an amount of image blocks that can be stored during the process of decoding is determined according to the size of the memory, and then, the scan layer is divided into a plurality of decoding areas according to the amount of image blocks.

Next, one of the divided decoding areas is sequentially selected as a local decoding area (Step S402). Next, the data of a first scan layer of the bitstream data is sequentially received, and the data in the local decoding area of the scan layer is decoded to generate a plurality of local decoding coefficients (Step S403). There is a certain order between each of the scan layers, and in this embodiment, the data of the scan layer received at the very beginning is the data of the scan layer arranged at the forefront of the bitstream data. Moreover, in the progressive decoding method, when decoding the data of a scan layer, the decoding result of a previous scan layer must be considered as a reference, so when generating the local decoding coefficients in this embodiment, they are also recorded in the memory as the reference for subsequently decoding other scan layers.

It should be noted that, in this embodiment, when starting to receive the data of a scan layer, first the initial address of the scan layer is sought and then the decoding is started from the initial address. Moreover, after completing the decoding of the data of one local decoding area for each scan layer, the last decoding address of the local decoding area is recorded as the initial position for decoding the next local decoding area. Conversely, each time before decoding a local decoding area of each scan layer, the last decoding address recorded previously is loaded, so as to continue decoding subsequent to the previous local decoding area. It can be known from the above description that, the method of this embodiment only needs to record the last decoding address after completing the decoding of each local decoding area instead of pre-storing the initial positions of all the local decoding areas, so the usage of the memory space is reduced.

After the data of one decoding area in a scan layer have been decoded, the data of the same local decoding area in the data of a next scan layer is received according to the order of the scan layers (Step S404), and then decoded with reference to the local decoding coefficients previously stored to generate new local decoding coefficients (Step S404). The new local decoding coefficients are accumulated to the previously stored local decoding coefficients (Step S406) as the reference for the next decoding, and now the accumulated local decoding coefficients include the information of two scan layers, thus having more image information.

Next, the accumulated local decoding coefficients are processed through inverse quantizing and inverse DCT, and they are output as a part of the image data (Step S407). There are two methods for outputting the local decoding coefficients, one is processing the accumulated local decoding coefficients through inverse quantizing and inverse DCT and outputting them after the data of the local decoding area of the last scan layer is decoded, and the other is processing the accumulated local decoding coefficients through inverse quantizing and inverse DCT and outputting them after the data of the local decoding area of each scan layer is decoded.

The difference between the two outputting methods lies in that: the local decoding coefficients accumulated after decoding the local decoding area of the last scan layer include the image information of all the scan layers, thus, the final output image is a complete one, and definitely, the image can be displayed only after waiting for a long time to decode all the scan layers in this method. Comparatively, the local decoding coefficients accumulated after decoding the data of the local decoding area of each scan layer only include the image information of this scan layer and that of the previous scan layers instead of the image information of all the scan layers, thus, the output image is also displayed in a progressive manner, and as the amount of decoded scan layers increases, the image displayed becomes more and more clear, and although the image at the beginning is not clear in this method, the user may view the preliminary appearance of the image, which is one characteristic of the progressive image.

The above inverse quantizing and inverse DCT processes both belong to linear calculation, and the calculation result will not be influenced, regardless of whether the local decoding coefficients are accumulated first and then processed or processed first and then accumulated. Similarly, the scaling of the dimension and size also belongs to the linear calculation, and thus this embodiment also supports the scaling process performed by a scaler. By changing the size of the output image before the inverse quantizing and inverse DCT processes, the calculation resource can be saved, and the image can be scaled rapidly.

In this embodiment, decoding is sequentially performed according to the position of each decoding area in the scan layer, and only the completed position of the previous decoding area needs to be recorded as the initial position for the next decoding area instead of recording the positions of all the decoding areas so that the usage of the memory space is effectively reduced.

Second Embodiment

The method for progressive JPEG image decoding in the present invention also can be applied to the control of a decoder, wherein a control system is used to control a decoding unit for decoding a bitstream data into an image data, and the image decoding effect can be achieved without using the memory having the same size as the picture to be decoded. The detailed steps of instruction transmission and data processing between the control system and the decoding unit are illustrated below through an embodiment.

Figure 5:
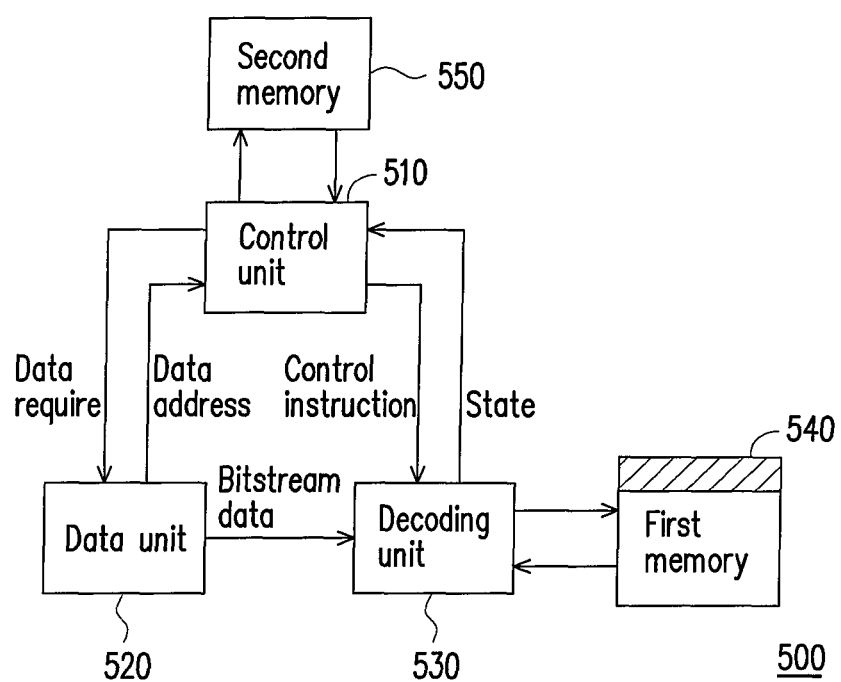
FIG. 5 is a block diagram of a control system of the decoder according to a second embodiment of the present invention.
Figure 6A:
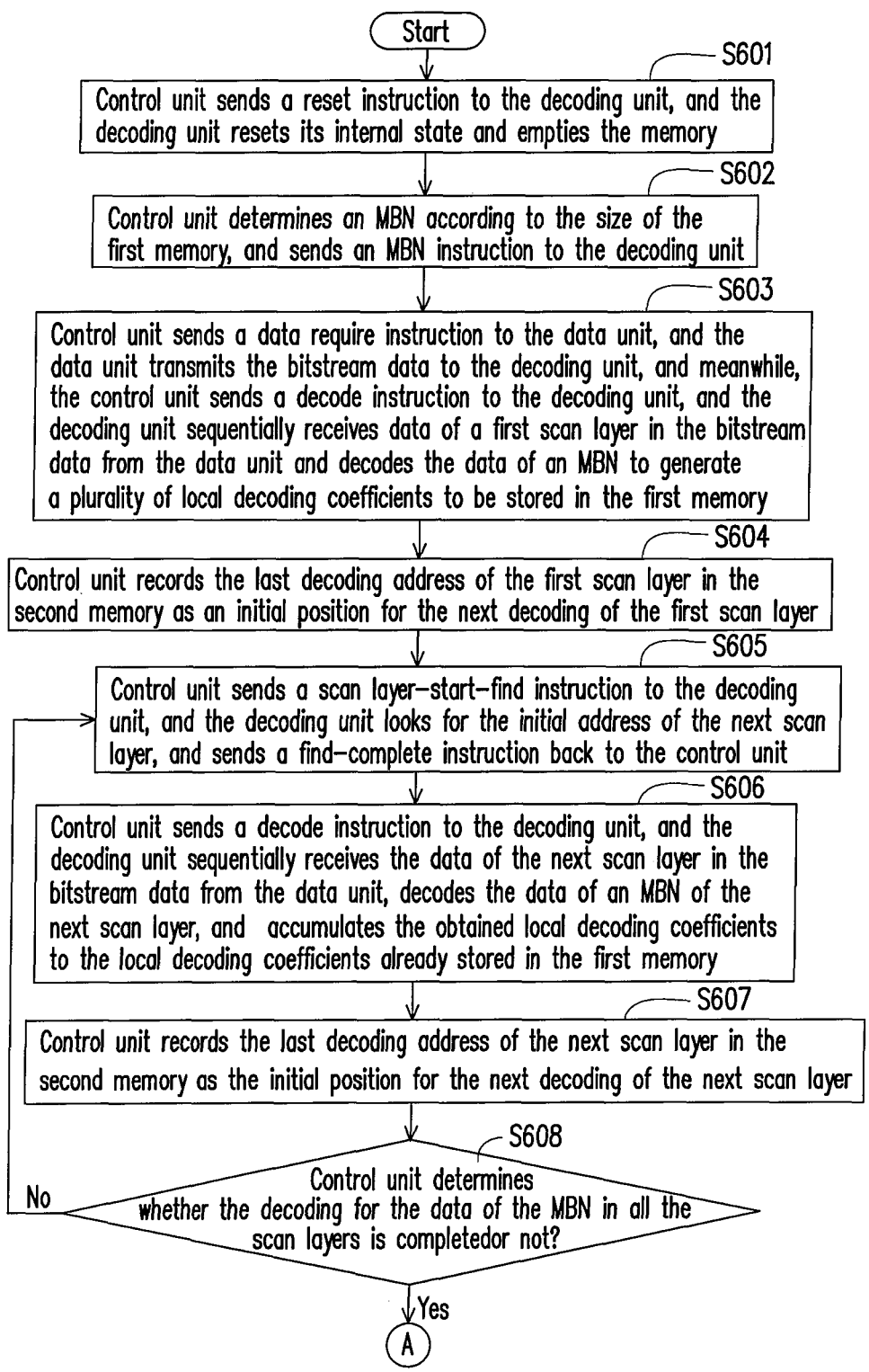
FIG. 6A is a flow chart of the method for controlling a decoder according to the second embodiment of the present invention.
Figure 6B:
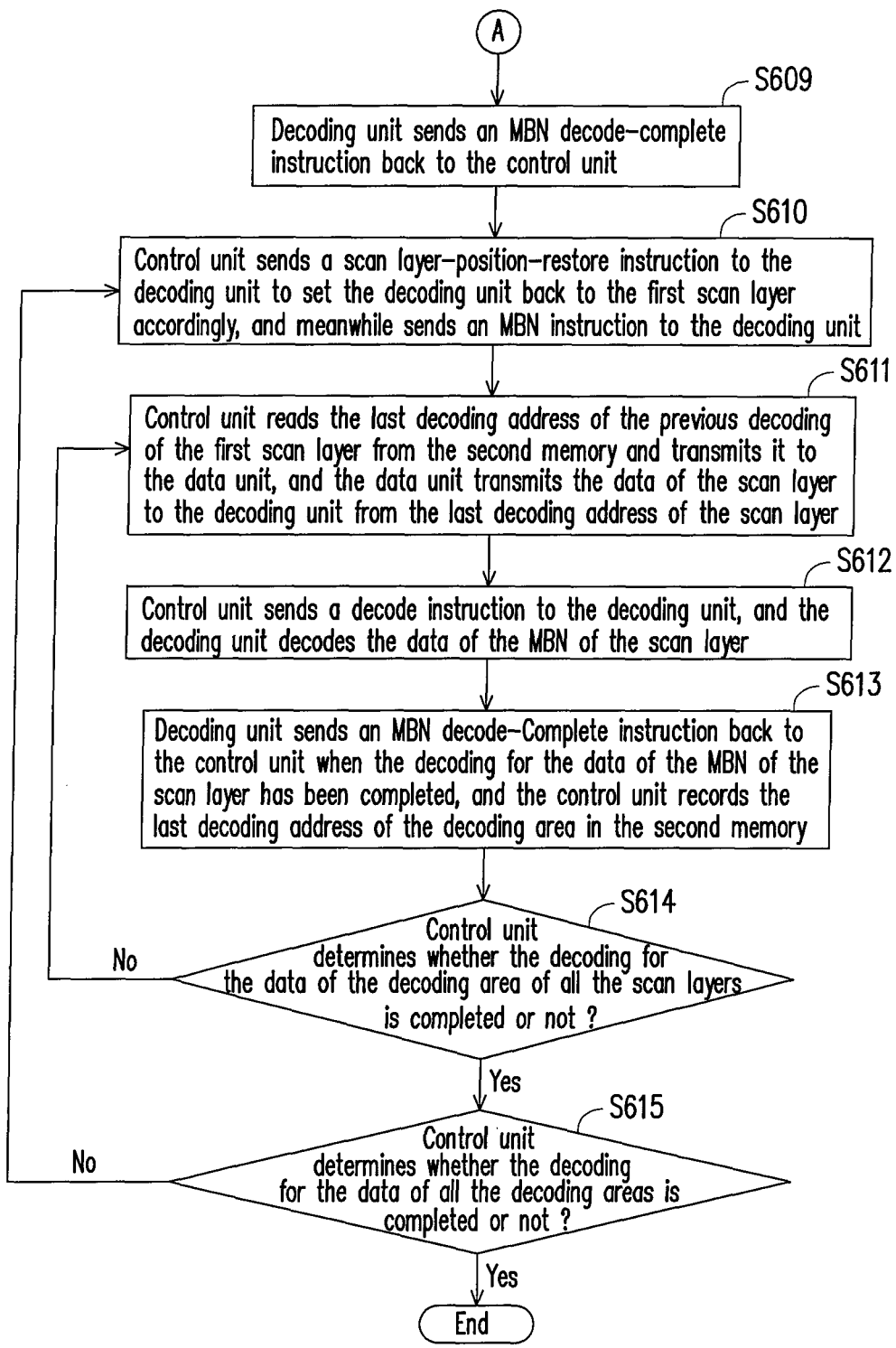
FIG. 6B is a flow chart of the method for controlling a decoder according to the second embodiment of the present invention.

FIG. 5 is a block diagram of a control system of a decoder according to a second embodiment of the present invention, and FIG. 6A and FIG. 6B are flow charts of the method for controlling the decoder according to the second embodiment of the present invention. Referring to FIG. 5 first, in this embodiment, the control system 500 includes a control unit 510, a data unit 520, a first memory 540 and a second memory 550, wherein the control unit 510 is individually connected to the data unit 520, the decoding unit 530 and the second memory 550, and the decoding unit 530 is further connected to the first memory 540.

Referring to both FIG. 5 and FIG. 6A, the state of the control unit 510 at the very beginning is set to an Initial state, and in Step S601, the control unit 510 sends a reset instruction to the decoding unit 530, and the decoding unit 530 resets its internal state and empties the first memory 540.

In Step S602, the control unit 510 determines a macroblock number (MBN) according to the capacity of the first memory 540 and sends an MBN instruction to the decoding unit 530, and the decoding unit 530 divides each scan layer in the bitstream data into a plurality of decoding areas according to the size of the decoding area.

In Step S603, the control unit 510 sends a data require instruction to the data unit 520, and at this time, the data unit 520 transmits the bitstream data to the decoding unit 530. Meanwhile, the control unit 510 further sends a decode instruction to the decoding unit 530, and the decoding unit 530 sequentially receives data of a scan layer in the bitstream data from the data unit 520, and decodes the data of a decoding area in the scan layer to generate a plurality of local decoding coefficients to be stored in the first memory 540. At this time, the control unit 510 is at a Decode state.

In Step S604, when the decoding of a decoding area has been completed, the control unit 510 is switched to an MBN_sos_end state. At this time, the control unit 510 records the last decoding address of the scan layer in the second memory 550 as the initial position for the next decoding.

In Step S605, the control unit 510 sends a scan layer-start-find instruction to the decoding unit 530, and then, the decoding unit 530 looks for the initial address of the next scan layer accordingly and its state is switched to an MBN_sos_start state. After the decoding unit 530 finds the initial address, it sends a find-complete instruction back to the control unit 510.

At this time, the method proceeds to Step S606, the control unit 510 sends a decode instruction to the decoding unit 530, and the decoding unit 530 sequentially receives data of a next scan layer in the bitstream data from the data unit 520 and decodes the data of a decoding area in the data of the scan layer, and the local decoding coefficients obtained from the decoding are accumulated to the local decoding coefficients previously stored in the first memory 540. Moreover, during decoding, the decoding unit 530 is switched to the Decode state. Similarly, in Step S607, when the data of the decoding area of the scan layer have been decoded, the control unit records the last decoding address of the scan layer in the second memory as the initial position for the next decoding of the scan layer.

In Step S608, it is determined whether the data of the decoding area of all the scan layers have been decoded or not. If there are still data of the decoding area of all the scan layers that have not been decoded yet, the method returns to Step S605, and Steps S605-S607 are repeated to continue decoding the data of the decoding area of each scan layer, and when the data of the decoding area of the last scan layer has been decoded, the decoding unit 530 is switched to an MBN_end state.

In the above steps, the decoding unit 530 has completed the decoding of the data of the first decoding area in all the scan layers, and the local decoding coefficients can be accumulated and processed through inverse quantizing and inverse DCT after being output by the decoding unit 530, so as to act as a part of the image data. Definitely, the present invention further includes decoding the data of a next decoding area, and the other steps of the method for controlling the decoder according to the present invention are illustrated below.

Referring to FIG. 6B, in Step S609, the control unit 510 receives an MBN decode-complete instruction sent back by the decoding unit 530, and at this time, it can be known that the data of the previous decoding area have all been decoded. Next, in Step S610, the control unit 510 sends a scan layer-position-restore instruction to the decoding unit 530 and sets the decoding unit 530 back to the first scan layer accordingly, and meanwhile, sends an MBN instruction to the decoding unit 530 for setting the number of macro-blocks to be decoded at one time as a decoding area.

In Step S611, the control unit 510 reads the last decoding address of the previous decoding of the scan layer from the second memory 550 and transmits it to the data unit 520, and the data unit 520 transmits the data of the scan layer to the decoding unit 530 from the last decoding address of the scan layer.

In Step S612, the control unit 510 sends a decode instruction to the decoding unit 530, and the decoding unit 530 starts to decode the data of a decoding area in the data of the scan layer. At this time, the decoding unit 530 is switched to the Decode state.

In Step S613, when the decoding of the data of the decoding area of the scan layer has been completed, the decoding unit 530 also sends an MBN decode-complete instruction back to the control unit 510, and the control unit 510 records the last decoding address of the scan layer in the second memory 550. At this time, the control unit 510 is also switched to the MBN_sos_end state.

In Step S614, the control unit 510 determines whether or not the data of the decoding area of all the scan layers have been decoded, wherein if there are still data of scan layers that have not been decoded yet, the method returns to Step S611 to continue decoding the data of the decoding area of the next scan layer; and if the data of all the scan layers have been decoded, the method proceeds to Step S615 to further determine whether the data of all the decoding areas have been decoded or not by the control unit 510, and if there are still decoding areas that have not been decoded yet, the method returns to Step S610 to set the decoding unit 530 back to the first scan layer and start decoding from the next decoding area of the first scan layer; on the contrary, if the data of all the decoding areas of all the scan layers have already been decoded, all decoding procedures have been completed.

It should be noted that, under the circumstance that there are no data provided by the data unit 520 to the decoding unit 530, the decoding unit 530 is switched to a Data_empty state, and at this time, the control unit 510 sends a new data require instruction to the data unit 520, and the data transmission is resumed by the data unit 520. When the data transmission is resumed, the control unit 510 is switched to the Decode state. Moreover, during the process of decoding by the decoding unit 530, if a decoding error occurs, the decoding unit 530 is switched to an Error state, and at this time, the control unit 510 is required to determine the manner for processing the error.

To sum up, in the method for progressive JPEG image decoding of the present invention, an amount of image blocks that can be stored during the process of decoding is determined according to the size of the memory, and according to the amount of image blocks, a scan layer is divided into a plurality of decoding areas, in each turn of decoding, the data of the same decoding area of all the scan layers are decoded. In the next turn, a decoding area next to the previous one is selected for decoding. Therefore, the present invention correctly decodes the image with limited memory resource, without affecting the display quality of the image.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for progressive JPEG image decoding, suitable for decoding a bitstream data containing data of a plurality of scan layers into an image data, comprising:
   (a) dividing the scan layers into a plurality of decoding areas, wherein a size of each of the decoding areas is determined by a capacity of a memory;
   (b) sequentially selecting the decoding areas as a local decoding area;
   (c) sequentially receiving data of a first scan layer from the scan layers in the bitstream data, decoding the local decoding area of the first scan layer, and generating a plurality of local decoding coefficients stored in the memory;
   (d) after the decoding of the local decoding area of the first scan layer has been completed, then sequentially receiving data of a scan layer next to the first scan layer in the bitstream data, decoding the data in the local decoding area of the next scan layer, and accumulating the decoded data of the next scan layer to the local decoding coefficients stored in the memory; and
   (e) processing the accumulated local decoding coefficients through inverse quantizing and inverse DCT as a part of the image data.

2. The method for progressive JPEG image decoding as claimed in claim 1, wherein step (e) comprises:
   processing the accumulated local decoding coefficients through inverse quantizing and inverse DCT and outputting them after the decoding of the local decoding areas from the entire scan layers has been completed totally.

3. The method for progressive JPEG image decoding as claimed in claim 1, wherein step (e) comprises:
   processing the accumulated local decoding coefficients through inverse quantizing and inverse DCT each time after the decoding of the local decoding areas from one of the scan layers has been completed.

4. The method for progressive JPEG image decoding as claimed in claim 1, wherein before receiving the data of the next scan layer in step (d), the method further comprises:
   looking for an initial address from the next scan layer as the initial address for decoding the next scan layer.

5. The method for progressive JPEG image decoding as claimed in claim 1, further comprising:
   recording a last decoding address of the local decoding area as an initial position for next local decoding area.

6. The method for progressive JPEG image decoding as claimed in claim 5, wherein before receiving the data of the next scan layer in step (d), the method further comprises:
   loading the last decoding address previous to a next decoding area when decoding data of the next decoding area from the next scan layer;
   decoding the next local decoding area from the last decoding address; and
   repeating the above steps, for respectively decoding the local decoding areas of the scan layers as a part of the image data.

7. The method for progressive JPEG image decoding as claimed in claim 1, wherein the image data is completely formed after the decoding of the decoding areas from the scan layers in the bitstream data has been completed totally.

8. A method for controlling a decoder, suitable for using a control system to control a decoding unit to decode a bitstream data into an image data, wherein the control system comprises a control unit, a data unit, a first memory and a second memory; and the bitstream data comprises data of a plurality of scan layers, the controlling method comprising:
   (a) sending a reset instruction to the decoding unit by the control unit, wherein the decoding unit resets an internal state and empties the first memory;
   (b) determining a decoding area by the control unit according to the size of the first memory, and sending a macroblock number instruction to the decoding unit to set a number of macroblocks included by the decoding area;
   (c) sending a data require instruction to the data unit by the control unit, wherein the data unit transmits the bitstream data to the decoding unit, and meanwhile, the control unit sends a decode instruction to the decoding unit, and the decoding unit sequentially receives the data of a first scan layer from the scan layers, decodes the data of the decoding area, generates a plurality of local decoding coefficients, and stores the plurality of local decoding coefficients in the first memory;
   (d) recording a last decoding address of the first scan layer in the second memory as an initial position for the next decoding of the first scan layer by the control unit;
   (e) sending a scan layer-start-find instruction to the decoding unit by the control unit, wherein the decoding unit looks for an initial address of a scan layer next to the first scan layer, and sends back a find-complete instruction to the control unit;
   (f) sending the decode instruction to the decoding unit using the control unit, wherein the decoding unit sequentially receives data of the next scan layer in the bitstream data from the data unit, decodes the data of the decoding area of the next scan layer and accumulates the decoded data of the decoding area of the next scan layer to the local decoding coefficients stored in the first memory;
   (g) recording a last decoding address of the next scan layer in the second memory as an initial position for the next decoding of the next scan layer using the control unit; and
   (h) repeating the steps (e)-(g) until the decoding of the decoding area of the scan layers has been completed totally.

9. The method for controlling the decoder as claimed in claim 8, wherein after step (h), the method further comprises:
   (i) sending a macroblock number decode-complete instruction back to the control unit by the decoding unit;
   (j) sending a scan layer-position-restore instruction to the decoding unit by the control unit to set the decoding unit back to the first scan layer, and sending the macroblock number instruction to the decoding unit;

(k) reading the last decoding address of the first scan layer from the second memory by the control unit, and transmitting the last decoding address to the data unit, wherein the data unit transmits data of the first scan layer to the decoding unit from the last decoding address of the first scan layer;

(l) sending the decode instruction to the decoding unit by the control unit, and decoding the data of decoding area of the first scan layer by the decoding unit;

(m) sending the macroblock number decode-complete instruction back to the control unit each time by the decoding unit when the decoding of the decoding area of the scan layer has been completed, and recording the last decoding address of the decoding area in the second memory by the control unit;

(n) returning to step (k) to continue decoding the data of the decoding area of the next scan layer next to the first scan layer, until the decoding of the decoding area of the scan layers has been completed totally; and (o) returning to step (j) to continue decoding the data of a next decoding area of the scan layers until the decoding of the decoding areas in the scan layers has been completed totally.

\* \* \* \* \*